United States Patent Office 3,375,191
Patented Mar. 26, 1968

3,375,191
PROCESS FOR THE HYDROCRACKING OF HYDROCARBONS WITHOUT A NET CONSUMPTION OF HYDROGEN
William Charles Pfefferle, Middletown, N.J., assignor to Engelhard Industries, Inc., a corporation of Delaware
No Drawing. Continuation-in-part of application Ser. No. 203,487, June 19, 1962. This application Mar. 25, 1966, Ser. No. 537,310
4 Claims. (Cl. 208—112)

The present application is a continuation-in-part of my copending application, Ser. No. 203,487, filed June 19, 1962, later abandoned.

This invention relates to the conversion of relatively higher molecular weight hydrocarbons to hydrocarbons of relatively lower molecular weight. More particularly, this invention relates to the conversion of relatively higher molecular weight distillate hydrocarbons to distillate hydrocarbons of relatively lower molecular weight in the presence of hydrogen and a catalyst without a net consumption of hydrogen.

The conversion of higher molecular weight hydrocarbons to lower molecular weight hydrocarbons in the presence of hydrogen and catalyst is a reaction known as hydrocracking. The reaction proceeds with a net consumption of hydrogen, i.e., at least a mole of hydrogen for each cracked hydrocarbon molecule. The reaction has also been proposed for use with higher molecular weight hydrocarbons such as materials boiling through the kerosene and gas oil ranges to upgrade these stocks to gasoline boiling range materials but the limited availability of low cost hydrogen makes commercial exploitation more costly.

In recent years there has been a considerable investigation of the use of supported platinum or palladium catalysts for hydrocracking. Such hydrocracking catalysts have generally been supported on highly acidic-mixed oxide supports, such as silica-alumina, including faujasite sieves, and silica-zirconia. To provide good selectivity for hydrocracking to normally liquid naphtha products, and to minimize gas make and coke production, operation with such highly acidic catalysts has usually been carried out below 800° F. and frequently in the 600° F. to 700° F. temperature range.

I have now discovered a process whereby relatively higher molecular weight hydrocarbons are converted to relatively lower molecular weight hydrocarbons in the presence of hydrogen and a platinum group metal on alumina catalyst and wherein there is no net consumption of hydrogen. The process of this invention essentially involves introducing into a reaction zone containing a platinum metal on alumina catalyst, a $C_1$ to $C_3$ alkane, such as methane, ethane or propane, together with the relatively higher molecular weight hydrocarbon and hydrogen. The $C_1$ to $C_3$ alkane is generally consumed during the conversion reaction, and there is no net consumption of hydrogen.

The reaction is economically attractive in contradistinction to hydrocracking in that methane is readily available at low cost and the methane together with any lower alkane by-products can be recycled to extinction permitting yields on both a volume and weight basis with respect to the relatively higher molecular weight hydrocarbon feed to exceed 100%.

The process of this invention thus comprises introducing into a reaction zone containing a platinum metal on alumina catalyst having dehydrocyclization activity and reacting a mixture consisting essentially of (A) a relatively higher molecular weight hydrocarbon, (B) a $C_1$ to $C_3$ alkane and (C) hydrogen in a ratio of at least one mole of (B) per mole of (A) and a molar ratio of (C) to (B) less than 1:1. The reaction conditions include a total pressure of 50 to 700 p.s.i.g., a hydrogen partial pressure of less than 200 p.s.i.g., preferably between 20 and 120 p.s.i.g., a temperature of about 650° to 900° F. and a weight hourly space velocity of about 0.05 to 20. Such operation permits cycle lengths of at least 48 hours making less than 0.5% by weight of carbon on feed. Advantageously the ratio of (B) to (A) is greater than 5:1 and can range up to 150:1. Also advantageously the ratio of (C) to (B) is less than 0.3 mole of (C) per mole of (B) and ranges up to 0.7 mole of (C) per mole of (B). The amount of hydrogen present is advantageously only sufficient to prevent $C_1$ to $C_3$ alkane decomposition and is in the higher portion of the range during low pressure and/or high temperature operation. Operation at temperatures above about 900° F. should be avoided to prevent thermal cracking, but below the thermal cracking range higher temperatures are to be preferred.

The relatively higher molecular weight hydrocarbon charge stocks which can be converted according to this invention comprise aliphatic hydrocarbons and aromatic hydrocarbons with an aliphatic side chain of at least two carbon atoms. They include, for example, heavy straight run naphtha, kerosene, and gas oil, light and heavy cycle oils from thermal or catalytic cracking, raffinates obtained by Udex extraction of light and heavy cycle oils, and the like, these charge stocks thus have a boiling range from about 400° F. up to about 750° F.

The catalysts useful in the process of this invention are those having dehydrocyclization activity and include the platinum group metal on activated alumina catalysts. Preferably the catalysts used in practicing the process of this invention are those which have a platinum group metal content of 0.1 to 2.5% by weight. The activated alumina must have some acidity which can be enhanced by addition of a small amount of halide, for example, less than 2% halogen. The platinum group metal of the catalyst is the essential component and these metals include for instance platinum, palladium, rhodium and iridium. A catalyst employed advantageously is a supported platinum catalyst containing for instance about 0.3 to 1.0 percent by weight platinum and the support is alumina characterized for instance by high surface area and large pore size. Such catalysts can be conveniently prepared as described in U.S. Patents Nos. 2,838,444 and 2,838,445.

The process of this invention is illustrated in detail in the following examples:

EXAMPLE 1

A fluoride-free platinum-alumina catalyst produced in a commercial plant which manufactures the catalyst of U.S. Patent 2,838,444 containing approximately 0.6 weight percent platinum in the form of one-sixteenth inch extrudates in an amount of 20 grams was placed in a one inch inside diameter universal stainless steel reactor tube dispersed with sufficient 8 to 14 mesh tabular alumina to provide a catalyst zone of about 250 cubic centimeters volume. The reactor, after each charging, was placed in a bronze-block furnace controlled by thermostats. Bed temperatures were measured by means of platinum and platinum-rhodium thermocouples. Each charge of catalyst was purged with nitrogen gas and then reduced overnight in a slow stream of hydrogen gas at about 900° F. and atmospheric pressure. The mixture of feed and recycle gas passed over the catalyst through the bed and the effluent was passed to a small volume high pressure separator from the top of which a gas phase was taken off for recycle and from the bottom of which a net product consisting of condensable liquid plus the net gas production was withdrawn and introduced into a product stabilizer. In order to minimize both holdup and flow upsets in the small volume system, the total net product was continuously removed using an air-operated flow control valve actuated by a back pressure recorder-controller. The total net product so removed was fed continuously into a product stabilizer to give a $C_5+$ liquid product and a $C_4-$ gas. The gas from the stabilizer was metered and then sampled by diverting a portion into an evacuated butyl rubber gas sample bag using a timer actuated solenoid valve. The recycle gas from the top of the high pressure separator was passed into a palladium diffusion unit prior to recycle. The diffusion unit comprised a jacketed palladium tube of one-eighth inch outside diameter approximately twenty feet long. A pressure gauge indicated the pressure of the through gas after leaving the diffusion unit and a separate pressure gauge indicated the pressure of the substantially pure hydrogen in the jacketed section of the diffusion unit. Substantially pure hydrogen was bled from the jacketed section at controlled rates. The recycle gas then was passed through an Ascarite scrubber and dryer for removal of water and acidic materials such as hydrogen sulfide. The feed system was a conventional pressure drop system including an alumina dryer. The feed was measured volumetrically. The feed and recycle gas dryers reduced the water content of the total feed to the unit to less than 100 parts of water per million parts by volume of total feed in vapor phase and the Ascarite scrubber substantially completely removed any sulfur from the recycle gas. The unit has proved suitable for accurately determining yield-octane relationships.

The feed charged to the unit was a heavy straight run gas oil, about $C_{10}$ to $C_{16}$, and had the following inspections:

ASTM dist., ° F. (recovery, 96.5%):
  Initial B.P. _____ 401
  10% _____ 427
  50% _____ 484
  90% _____ 560
  E.P. _____ 574
Sulfur _____p.p.m__ 74
Chlorine _____p.p.m__ 3.4
Nitrogen _____p.p.m__ 3.4

Analysis of both gas and liquid samples for $C_1$ through $C_5$ hydrocarbons was by gas chromatography. Analysis of gas samples for hydrogen was by Orsat. All components of a gas sample were determined independently and then summed as a check against errors. All gas analyses were converted to an air-free basis before use in yield calculations.

The system was pressured with hydrogen and a mole of methane was charged for each mole of liquid hydrocarbon charge stock. After lining out, the unit was operated at a temperature of 800° F., a total pressure of 350 p.s.i.g., a weight hourly space velocity of 2, a gas recycle ratio of 20 to 1, and a hydrogen partial pressure in the recycle gas stream during the hours 6 to 24 of 105–107 and during hours 39–45 of 55. The run demonstrates a consumption of methane and a net hydrogen production under the run conditions.

The operating conditions, yield and product inspection data are shown in the following Table I. Yields are given as the percent on feed and were calculated on the basis of 100% recovery.

TABLE I

| | Run No. 2,019 | | | |
|---|---|---|---|---|
| Operating Conditions: | | | | |
| Hours on Oil | 6–12 | 12–18 | 18–24 | 39–45 |
| Temp., ° F | 800 | 800 | 800 | 800 |
| WHSV | 2 | 2 | 2 | 2 |
| Recycle Ratio, Mol/Mol: | | | | |
| Total Gas | 20/1 | 20/1 | 20/1 | 20/1 |
| Hydrogen | 5.8 | 5.9 | 5.8 | 3.0 |
| Press.: | | | | |
| Total p.s.i.g. | 350 | 350 | 350 | 350 |
| Hydrogen (Diffusion Unit) p.s.i.a. | 105 | 107 | 105 | 55 |
| Yield Based on 100% Recovery: | | | | |
| $H_2$, Wt. percent | 2.3 | 2.1 | 2.1 | 1.5 |
| $C_1$, Wt. percent | −2.0 | −1.6 | −2.2 | −0.8 |
| $C_2$, Wt. percent | 0.7 | .6 | .4 | .3 |
| $C_3$, Wt. percent | .9 | .7 | .6 | .4 |
| $C_4$, Wt. percent | .6 | .4 | .4 | .2 |
| $C_5$, Wt. percent | 97.5 | 97.8 | 96.4 | 96.5 |
| $C_5+$, Vol. percent | 94.7 | 95.5 | 96.1 | 98.3 |
| Recovery, Wt. percent | 94.9 | 99.7 | 96.1 | 98.3 |
| Product Inspections: | | | | |
| Aromatics, Vol. percent | 51 | 49 | 49 | 44 |
| Vol. percent $C_5+$ to 400° F | 15 | 15 | 12 | 9 |

EXAMPLE 2

In this example, the apparatus and catalyst were the same as employed in Example 1. The feed charged to the unit was a straight run gas oil having the following inspections:

ASTM dist., ° F.:
  Initial B.P. _____ 434
  5% _____ 447
  10% _____ 452
  20% _____ 461
  30% _____ 468
  40% _____ 475
  50% _____ 483
  60% _____ 492
  70% _____ 501
  80% _____ 511
  90% _____ 527
  95% _____ 546
  E.P. _____ 554
Density:
  15° C. _____ 0.8664
  20° C. _____ 0.8648
  25° C. _____ 0.8632
Aromatics, vol. percent _____ 21
Molecular weight (calculated) _____ 186
Sulfur _____p.p.m__ 1036
Chlorine _____p.p.m__ 2.5
Nitrogen _____p.p.m__ 11.5

The operating conditions, yield and product inspection data are shown in the following Table II. Yields are given as the percent on feed and were calculated on the basis of 100% recovery. The hydrogen bleed rate represents the hydrogen bled from the jacketed section of the diffusion unit. Again the run demonstrates a net consumption of methane and a net production of hydrogen under the run conditions.

TABLE II

| Operating Conditions: | Run No. 2059 | | | | | | | | |
|---|---|---|---|---|---|---|---|---|---|
| Hours on Oil | 7-15 | 15-23 | 23-31 | 34-42 | 42-50 | 50-58 | 60-68 | 68-75 | 76-84 |
| Temp., °F | 801.0 | 801.1 | 801.0 | 800.4 | 801.0 | 801.0 | 801.1 | 801.5 | 800.8 |
| WHSV | 2.001 | 1.998 | 2.023 | 2.003 | 2.00 | 2.009 | 2.002 | 2.003 | 2.019 |
| Methane/Feed Mol Ratio | 1.027 | 1.016 | 0.976 | 0.982 | 0.995 | 1.004 | 1.001 | 1.007 | 1.006 |
| Recycle Ratio, Mol/Mol: Total Gas | 19.92 | 19.92 | 19.5 | 19.75 | 19.72 | 20.002 | 19.12 | 19.89 | 19.97 |
| Press. p.s.i.g.: | | | | | | | | | |
| Total | 350 | 350 | 350 | 350 | 350 | 350 | 350 | 350 | 350 |
| Hydrogen (Diffusion Unit) | 89.6 | 90 | 91.8 | 40.5 | 40.1 | 40.5 | 20 | 19.5 | 20.6 |
| Hydrogen Bleed Rate, Mol/Mol Feed | 1.156 | 0.933 | 0.866 | 1.167 | 1.027 | .9186 | .743 | .352 | .1685 |
| Yield Based on 100% Recovery: | | | | | | | | | |
| $H_2$, Wt. percent | 2.1 | 1.9 | 1.7 | 1.6 | 1.5 | 1.4 | 1.2 | 0.6 | 0.4 |
| $C_1$, Wt. percent | -2.1 | -1.3 | 0.1 | -2.5 | -1.9 | -1.1 | -.1 | 0.7 | -0.6 |
| $C_2$, Wt. percent | 0.7 | 0.6 | 0.5 | 0.4 | 0.4 | .3 | .3 | .3 | .1 |
| $C_3$, Wt. percent | 1.3 | 1.0 | 0.9 | 0.6 | 0.4 | .4 | .5 | .3 | .2 |
| $iC_4$, Wt. percent | 0.3 | 0.2 | 0.2 | 0.1 | 0.1 | .1 | .1 | .1 | .05 |
| $nC_4$, Wt. percent | 0.3 | 0.3 | 0.2 | 0.1 | 0.1 | .1 | .1 | .1 | .05 |
| $C_5+$, Wt. percent | 97.4 | 97.3 | 96.4 | 99.7 | 99.4 | 98.8 | 97.9 | 97.9 | 99.8 |
| $C_5+$, Vol. percent | 94.1 | 94.4 | 93.7 | 96.9 | 96.9 | 96.8 | 96.3 | 97.1 | 98.9 |
| Recovery, Vol. percent $C_5$ to 400° F | 95.9 | 96.8 | 97.6 | 95.4 | 95.6 | 97.7 | 98.6 | 98.4 | 99.1 |
|  | 9.5 | 7 | 7 | 5.5 | 4.5 | 4 | 3.5 | 3 | 2 |
| Product Inspection (total liquid): | | | | | | | | | |
| Density | .8968 | .8934 | .8917 | .8917 | .8883 | .8840 | .8810 | .8735 | .8714 |
| Aromatics, Vol. percent | 73 | 66 | 65 | 65 | 60 | 57 | 50 | 44 | 46 |

EXAMPLE 3

In this example, the apparatus and catalyst were the same as employed in Examples 1 and 2. The feed charged to the unit was Peruvian light straight run gas oil having the following inspections:

| ASTM dist., °F. (recovery 98.7%): | |
|---|---|
| 5 | 407 |
| 10 | 414 |
| 20 | 423 |
| 30 | 433 |
| 40 | 442 |
| 50 | 450 |
| 60 | 460 |
| 70 | 469 |
| 80 | 479 |
| 90 | 494 |
| 95 | 503 |
| Density: | |
| 15° C. | 0.8426 |
| 20° C. | 0.8402 |
| 25° C. | 0.8378 |
| Aromatics, vol. percent | 15 |
| Molecular wt. (calculated) | 171 |
| Sulfur p.p.m. | 79.9 |
| Chlorine p.p.m. | 5.1 |

The operating conditions, yield and product inspection data are shown in the following Table III. Yields are given as the percent on feed and were calculated on the basis of 100% recovery. Again the run demonstrates a net consumption of methane during hours 7 to 58 at a temperature of about 800° F., a slight net production of methane during hours 61 to 85 wherein the temperature was maintained at about 850° F., and a somewhat larger net production of methane during hours 88 to 104 wherein the temperature was maintained at about 896° F. At all times there was a net production of hydrogen.

TABLE III

| Operating Conditions: | Run No. 2053 | | | | | | | | | | | |
|---|---|---|---|---|---|---|---|---|---|---|---|---|
| Hours on Oil | 7-15 | 15-23 | 23-31 | 34-42 | 42-50 | 50-58 | 61-69 | 60-77 | 77-85 | 88-96 | 96-104 | |
| Temp., °F | 801.0 | 801.0 | 801.3 | 800.6 | 800.6 | 800.4 | 849.7 | 849.9 | 849.9 | 896.0 | 895.8 | |
| WHSV | 1.99 | 1.994 | 1.98 | 1.997 | 2.001 | 1.995 | 2.002 | 1.998 | 2.004 | 2.003 | 1.996 | |
| Methane/Feed Mol Ratio | 1.017 | 1.015 | 1.01 | 1.011 | 1.006 | 1.003 | 1.006 | 1.008 | 1.006 | 1.006 | 1.009 | |
| Recycle Ratio, Mol/Mol: Total Gas | 20.00 | 19.9 | 20.1 | 20.04 | 19.95 | 20.12 | 19.95 | 19.91 | 19.98 | 19.95 | 20.01 | |
| Press. p.s.i.g.: | | | | | | | | | | | | |
| Total | 350 | 350 | 350 | 350 | 350 | 350 | 350 | 350 | 350 | 350 | 350 | |
| Hydrogen (Diffusion Unit) | 91 | 91.5 | 91 | 40 | 41 | 40.5 | 40.3 | 41 | 40.8 | 41.6 | 40.8 | |
| Hydrogen Bleed Rate, Mol/Mol Feed | 0.812 | 0.714 | 0.7139 | 1.001 | 0.992 | 0.971 | 1.057 | 1.037 | 1.026 | 1.135 | 1.07 | |
| Yield Based on 100% Recovery: | | | | | | | | | | | | |
| $H_2$, Wt. percent | 2.7 | 2.3 | 2.2 | 2.6 | 2.4 | 2.4 | 2.4 | 2.4 | 2.4 | 2.4 | 2.3 | |
| $C_1$, Wt. percent | -2.7 | -0.4 | -0.3 | -2.2 | -1.8 | -0.5 | 0.22 | 0 | 0.8 | 2.5 | 2.5 | |
| $C_2$-$C_4$, Wt. percent | 2.5 | 2.1 | 2.1 | 1.8 | 1.8 | 1.6 | 3.0 | 2.8 | 2.8 | 4.7 | 4.3 | |
| $C_5+$, Wt. percent | 97.5 | 96.0 | 95.7 | 97.8 | 97.6 | 96.5 | 94.4 | 94.8 | 94.0 | 90.4 | 90.9 | |
| $C_5+$, Vol. percent | 98.4 | 92.2 | 92.0 | 94.0 | 93.8 | 92.9 | 89.9 | 90.6 | 90.0 | 85.9 | 86.9 | |
| $C_1$ | -2.7 | -0.4 | -0.3 | -2.2 | -1.8 | -0.5 | 0.2 | 0 | 0.8 | 2.5 | 2.5 | |
| $C_2$ | 0.8 | 0.7 | 0.6 | 0.5 | 0.5 | 0.5 | 0.9 | 0.8 | 0.8 | 1.3 | 1.3 | |
| $C_3$ | 1.0 | 0.9 | 1.0 | 0.8 | 0.8 | 0.7 | 1.2 | 1.2 | 1.2 | 2.0 | 1.9 | |
| $iC_4$ | 0.3 | 0.2 | 0.2 | 0.2 | 0.2 | 0.2 | 0.4 | 0.4 | 0.3 | 0.7 | 0.5 | |
| $nC_4$ | 0.4 | 0.3 | 0.3 | 0.3 | 0.3 | 0.2 | 0.5 | 0.4 | 0.5 | 0.7 | 0.6 | |
| Recovery | 96.1 | 98.1 | 98.0 | 96.3 | 97.0 | 98.1 | 98.4 | 98.4 | 100.0 | 100.9 | 101.3 | |
| Vol. percent $C_5$ to 400° F | 13.5 | 12 | 12 | 11 | 10.5 | 10.5 | 16.5 | 14.5 | 14 | 21 | 20.5 | |
| Product Inspections (total liquid): | | | | | | | | | | | | |
| Density | .8800 | .8773 | .8768 | .8768 | .8768 | .8857 | .8845 | .8817 | .8800 | .8870 | .8810 | |
| Aromatics, Vol. percent | 68 | 68 | 67 | 66 | 66 | 66 | 76 | 72 | 72 | 77 | 71 | |
| Product Inspections ($C_5$ to 400° F. cut): | | | | | | | | | | | | |
| Aromatics | 45 | 44 | 42 | 40 | 41 | 41 | 46 | 44 | 44 | 50 | 47 | |
| RON, Clear | 79.0 | 79.0 | 79.0 | | | | 80.9 | 80.9 | 80.9 | 84.3 | 84.3 | |

I claim:

1. A process for the conversion of relatively higher molecular weight hydrocarbons to hydrocarbons of relatively lower molecular weight without a net consumption of hydrogen which comprises introducing into and maintaining in a reaction zone and reacting a mixture consisting essentially of (A) a relatively higher molecular weight hydrocarbon, (B) a $C_1$ to $C_3$ alkane and (C) hydrogen in a ratio of at least one mole of (B) per mole of (A) and a molar ratio of (C) to (B) less than 1:1 at a total pressure of about 50 to about 700 p.s.i.g., a hydrogen partial pressure of less than 200 p.s.i.g., a temperature of about 650° to about 900° F., a weight hourly space velocity of 0.05 to 20 and in contact with a platinum group metal on acidic alumina catalyst, the reaction period being at least 48 hours in duration and the carbon yield on feed at the end of the reaction period being less than 0.5% by weight.

2. The process of claim 1 wherein the relatively higher molecular weight hydrocarbon has a boiling range of about 400° F. to 750° F., the ratio of (B) to (A) is greater than 5:1 and ranges up to 150:1, the ratio of (C) to (B) is less than 0.3, and the platinum group metal on acidic alumina catalyst is platinum on acidic alumina.

3. A process for the conversion of relatively higher molecular weight hydrocarbons to hydrocarbons of relatively lower molecular weight without a net consumption of hydrogen and with a net consumption of methane which comprises introducing into and maintaining in a reaction zone and reacting a mixture consisting essentially of (A) a relatively higher molecular weight hydrocarbon, (B) methane and (C) hydrogen in a ratio of at least one mole of (B) per mole of (A) and a molar ratio of (C) to (B) less than 1:1 at a total pressure of about 50 to about 700 p.s.i.g., a hydrogen partial pressure of between 20 and 120 p.s.i.g., a temperature of about 650° to about 900° F., a weight hourly space velocity of 0.05 to 20 and in contact with a platinum group metal on acidic alumina catalyst, the reaction period being at least 48 hours in duration and the carbon yield on feed at the end of the reaction period being less than 0.5% by weight.

4. The process of claim 3 wherein the relatively higher molecular weight hydrocarbon has a boiling range of about 400° F. to 750° F., the ratio of (B) to (A) is greater than 5:1 and ranges up to 150:1, the ratio of (C) to (B) is less than 0.3, and the platinum group metal on acidic alumina catalyst is platinum on acidic alumina.

References Cited

UNITED STATES PATENTS

| | | | |
|---|---|---|---|
| 2,358,879 | 9/1944 | Redcoy | 208—111 |
| 2,414,889 | 1/1947 | Murphree | 208—111 |
| 3,008,895 | 11/1961 | Hansford et al. | 208—68 |
| 3,058,906 | 10/1962 | Stine et al. | 208—111 |
| 3,210,264 | 10/1965 | Haney | 208—112 |

ABRAHAM RIMENS, *Primary Examiner.*

DELBERT E. GANTZ, *Examiner.*